United States Patent [19]

Shah

[11] Patent Number: 5,630,052
[45] Date of Patent: May 13, 1997

[54] SYSTEM DEVELOPMENT AND DEBUG TOOLS FOR POWER MANAGEMENT FUNCTIONS IN A COMPUTER SYSTEM

[75] Inventor: Tushar Shah, Beaverton, Oreg.

[73] Assignee: Intel Corporation, Santa Clara, Calif.

[21] Appl. No.: 730,891

[22] Filed: Oct. 18, 1996

Related U.S. Application Data

[63] Continuation of Ser. No. 519,624, Aug. 25, 1995, abandoned, which is a continuation of Ser. No. 129,662, Sep. 30, 1993, abandoned.

[51] Int. Cl.$^6$ ..................................................... G06F 11/00
[52] U.S. Cl. ........................... 395/183.14; 395/183.04; 395/183.09; 371/25.1
[58] Field of Search ......................... 395/183.04, 183.05, 395/183.16, 183.21, 183.22, 183.09, 183.14, 183.13; 371/25.1

[56] References Cited

U.S. PATENT DOCUMENTS

| | | | |
|---|---|---|---|
| 4,674,089 | 6/1987 | Poret et al. | 371/25 |
| 4,796,258 | 1/1989 | Boyce et al. | 371/16.2 |
| 5,056,013 | 10/1991 | Yamamoto | 395/500 |
| 5,132,971 | 7/1992 | Oguma et al. | 371/16.2 |
| 5,329,471 | 7/1994 | Swoboda et al. | 364/578 |
| 5,333,307 | 7/1994 | Shirk et al. | 395/575 |
| 5,392,420 | 2/1995 | Balmer et al. | 395/500 |

OTHER PUBLICATIONS

Intel 386 SL Microprocessor SuperSet Programmer's Reference Manual, Intel Corporation, 1992, at chapter 6.

Intel 386 SL Microprocessor SuperSet System Design Guide, Intel Corporation, 1992, at chapter 14.

Fisher, Intel to Stress Power-saving Features in its 486 Chip Blits, PC Week, Sep. 21, 1992, at 1.

"Intel486 SL Microprocessor SuperSet Programmer's Reference Manual", Intel Corporation, pp. 3-4, 3-6, 3-10 and 6-4 thru 6-14, Nov., 1992.

Primary Examiner—Robert W. Beausoliel, Jr.
Assistant Examiner—Norman M. Wright
Attorney, Agent, or Firm—Blakely, Sokoloff, Taylor & Zafman

[57] ABSTRACT

An in-circuit processor emulator for a computer system that provides a go until system management interrupt command to perform processor emulation until the computer system enters a system management mode during a system management interrupt. The in-circuit processor emulator also provides an enable system management memory command for enabling and disabling access to a system management overlay memory, and an unlock control register command for unlocking a set of control registers in an input/output and power control circuit in the computer system. The commands enable development and debug of system management mode power control functions.

17 Claims, 6 Drawing Sheets

SYSTEM DEVELOPMENT AND DEBUG TOOLS FOR POWER MANAGEMENT FUNCTIONS IN A COMPUTER SYSTEM

This is a continuation of application Ser. No. 08/519,624, filed Aug. 25, 1995, now abandoned, which is a continuation of application Ser. No. 08/129,662, filed Sep. 30, 1993, now abandoned.

BACKGROUND OF THE INVENTION

1. Field of the Invention

The present invention pertains to the field of personal computer systems. More particularly, this invention relates to system development and debug tools for power management functions in a computer system.

2. Art Background

In-circuit emulators are commonly employed to develop and debug computer systems including portable computer systems. A typical in-circuit emulator provides a processor emulation module and a host computer. The processor emulation module emulates processor functions for a target computer system. The host computer controls the emulation functions. The processor emulation module is usually inserted into the target computer system in place of the target processor. The processor emulation module emulates the target processor according to user commands entered on the host processor.

Typically, such in-circuit emulators perform a variety of emulation functions. For example, in-circuit emulators usually perform emulation functions for downloading and modifying target system software and examining target system memory. Such in-circuit emulators also commonly provide processor control functions such as run, halt, and run until the occurrence of a breakpoint condition. In addition, such in-circuit emulators typically enable examination of the internal processor registers.

Portable personal computer systems typically implement a variety of hardware power control functions. Such hardware power control functions may include hardware functions for powering down unused peripherals, as well as sleep modes for the processor and other circuitry. Such hardware power control functions increase battery life of the portable personal computer system by minimizing power consumption.

A typical portable computer system implements system power management software for controlling the hardware power control functions. Such system power management software usually determines conditions for power reduction and enables the appropriate hardware power control function. For example, the system power management software may detect a reduction in accesses to a disk drive, and then spin down the disk drive to minimize power demands on the battery.

One prior processor for a portable computer system implements a system management interrupt mechanism for the power management functions. The system management interrupt directs processor execution to a system management interrupt service routine. The processor functions in a system management mode while servicing the system management interrupt. The system management interrupt service routine determines conditions for power reduction and enables the appropriate hardware power control function. The interrupt service routine for the system management mode is stored in a system management overlay memory accessible only while the processor is in the system management mode.

Unfortunately, prior in-circuit emulators are unsuitable for developing and debugging the power control functions in such prior systems. For example, prior in-circuit emulators are unable to break emulation upon entry into the system management mode. Moreover, prior in-circuit emulators cannot access the system management overlay memory while the processor is not in the system management mode. As a consequence, such prior in-circuit emulators cannot easily load and modify the power control software in the system management overlay memory, and therefore increase the difficulty of developing and debugging power management functions for the computer system.

SUMMARY AND OBJECTS OF THE INVENTION

One object of the present invention is to provide an in-circuit emulator for a computer system, wherein the emulator provides specialized commands for developing and debugging power control functions in a computer system.

Another object of the present invention is to provide an in-circuit emulator having a command for performing processor emulation until a system management interrupt is detected, wherein the system management interrupt causes the processor to enter a system management mode.

Another object of the present invention is to provide an in-circuit emulator having a command for enabling and disabling emulator access to a system management overlay memory.

A further object of the present invention is to provide an in-circuit emulator having a command for unlocking control registers in an input/output circuit of the computer system.

These and other objects of the invention are provided by an in-circuit emulator for a computer system. The in-circuit emulator provides a user command specifying a go until system management interrupt emulator function. The go until system management interrupt command causes an emulation controller to transfer a start processor emulation message to a processor emulation module coupled to the computer system. The start processor emulation message causes the processor emulation module to enter a processor emulation mode. The processor emulation module performs program execution from a user memory in the computer system while in the processor emulation mode.

An module control circuit in the processor emulation module senses a system management mode entry message indicating that the processor emulation module has received a system management interrupt and has entered a system management mode. The processor emulation module executes an interrupt service routine in the system management mode for power management functions in the computer system. The interrupt service routine is stored in a system management memory in the computer system. The processor emulation module generates a system management memory select signal in the system management mode. The system management select signal causes the system management memory to overlay the user memory.

The emulation controller transfers a halt processor emulation message to the processor emulation module after the system management mode entry message is sensed. The halt processor emulation message causes the processor emulation module to halt program execution and enter an interrogate mode. The user accesses the system management memory through the emulation controller.

The in-circuit processor emulator also provides a user command specifying an enable system management memory emulator function. The enable system management memory command causes the emulation controller to set a system management mode bit in a mode control register of the processor emulation module. The system management mode bit causes the processor emulation module to generate the system management memory select signal. The system management memory select signal causes the system management memory to overlay the user memory. The user then accesses the system management memory through the emulation controller.

The in-circuit emulator also provides a user command specifying an unlock control register emulator function. The unlock command causes the emulation controller to perform a predefined access sequence over the system bus. The predefined access sequence unlocks a set of control registers contained in an input/output circuit coupled to the system bus. The user then accesses the control registers over the system bus in the interrogate mode.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
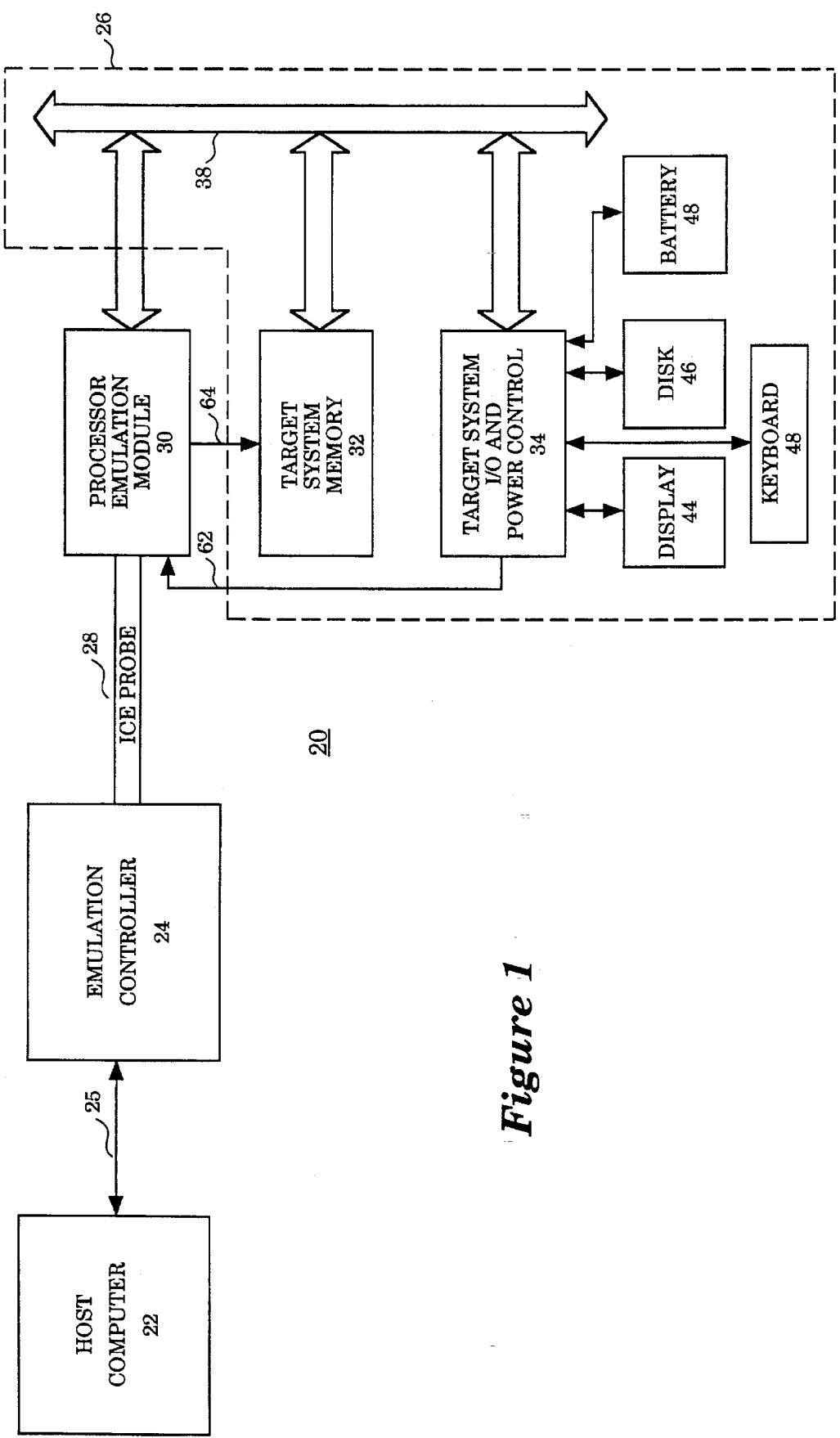
FIG. 1 illustrates an in-circuit emulator (ICE) system which comprises a host computer system, an emulation controller, and a processor emulation module coupled to a target computer system.

FIG. 1 illustrates an in-circuit emulator (ICE) system 20. The in-circuit emulation system 20 comprises a host computer system 22, an emulation controller 24, a processor emulation module 30, and a target computer system 26.

A user enters emulation commands for the ICE system 20 through the host computer system 22. The host computer system 22 comprises a CPU, memory and mass storage subsystems as well as a display monitor and other input/output devices. The host computer system 22 represents a wide variety of computer systems including personal computer systems.

The target computer system 26 comprises a target system memory circuit 32 and a target system input/output (I/O) and power control circuit 34. The target system memory circuit 32 and the target system I/O and power control circuit 34 are coupled for communication over a target system bus 38.

Normally, the target computer system 26 includes a target processor (not shown) for program execution. For one embodiment, the target processor for the target computer system 26 is part of a chip set for portable computer systems. The chip set includes the target processor and the target system I/O and power control circuit 34.

The target system I/O and power control circuit 34 provides hardware power control functions for the target computer system 26, and provides serial and parallel I/O interfaces for peripherals of the target computer system 26. For example, the target system I/O and power control circuit 34 provides I/O interfaces for a display device 44, a keyboard 48 and a disk drive 46. The target system I/O and power control circuit 34 also provides an I/O interface for monitoring a battery circuit 48 that powers the target computer system 26.

The target system I/O and power control circuit 34 performs a set of hardware power control functions under control of system management software implemented in the target computer system 26. The hardware power control functions include, for example, a programmable processor clock speed control and programmable power control signals for powering down devices (such as the disk drive 46 and the display device 44). The hardware power control functions also include monitoring of the battery circuit 48 voltage levels.

The target system I/O and power control circuit 34 generates a system management interrupt (SMI) signal 62 to indicate that the hardware power control functions require servicing by the system management software. The SMI signal 62 is a non maskable interrupt to the target processor of the target computer system 26. The SMI signal 62 causes the target processor to enter a system management mode (SMM), and causes transfer of processor execution to the system management code stored in the target system memory 32.

The target system memory circuit 32 provides code and data storage for system software, application programs and device driver programs executing on the target computer system 26.

The target system memory circuit 32 includes a system management memory (SM-MEM) that provides code and data storage for the system management code. The SM-MEM is an overlay memory to the user memory 72 accessible by the target processor while in the system management mode. The target processor generates an SM-MEM select signal 64 to the target system memory circuit 32 to access the SM-MEM overlay memory.

The processor emulation module 30 is coupled into the target computer system 26 in place of the target processor to perform in-circuit emulation functions. The processor emulation module 30 couples to the emulation controller 24 through an in-circuit emulation (ICE) probe 28. The emulation controller 24 communicates with the host computer system 22 over a serial communication line 25.

The user enters commands on the host processor 22 to cause the processor emulation module 30 to function in either a processor emulation mode or an ICE mode. The host processor 22 transfers the commands to the emulation controller 24 over the serial communication line 25, and the emulation controller 24 issues the appropriate control messages to the processor emulation module 30 through the ICE probe 28.

The processor emulation module 30 emulates the target processor of the target computer system 26 during the processor emulation mode. The processor emulation module 30 communicates over the target system bus 38 and executes the software for the target computer system 26 in the processor emulation mode. During the processor emulation mode, the processor emulation module 30 senses the SMI signal 62 from the target system I/O and power control circuit 34, enters the system management mode, and generates the SM-MEM select signal 64 to access the SM-MEM overlay memory in the target system memory circuit 32 in the system management mode.

The ICE mode is an interrogate mode, wherein the user on the host computer system 22 enters commands to cause the emulation controller 24 to access the resources of the target computer system 26 through the ICE 28. For example, user commands cause the emulation controller 24 to read the target system memory 32 through the ICE probe 28 over the target system bus 38. The user commands also cause the emulation controller 24 to access the target system I/O and power control circuit 34 through the ICE probe 28 over the target system bus 38.

The commands entered by the user at the host computer system 22 include commands to start processor emulation mode and halt processor emulation mode, as well as commands for setting and clearing break points. In the ICE mode, the user enters commands that cause the processor emulation module 30 to "dump" the contents of internal registers to the in circuit memory for later examination.

The user enters a go_until_smi command at the host processor 22 to cause the emulation controller 24 to start the processor emulation mode of the processor emulation module 30, and to continue the processor emulation mode until the processor emulation module 30 detects a system management interrupt and enters the system management mode. After the user enters the go_until_smi command, the processor emulation module 30 enters the processor emulation mode, and then breaks into the ICE mode when the system management mode is entered.

The user enters an SMMEM command at the host processor 22 to cause the emulation controller 24 to enable or disable access to the SM-MEM of the target system memory 32 according to an SMMEM enable option or an SMMEM disable option. The SMMEM enable command allows the user to enable and access the SM-MEM even when the processor emulation module 30 is not in the system management mode as is normally required. The user enters the SMMEM command to load the SMM code into the SM-MEM. The user also enters the SMMEM command to examine and disassemble the SMM code in the SM-MEM.

The target system I/O and power control circuit 34 contains a set of control registers controlling I/O functions and the hardware power control functions for the target computer system 26.

For one embodiment, the control registers are mapped to an I/O address space over the target system bus 38. The control registers are normally locked from access unless a predefined unlock I/O access sequence is performed over the target system bus 38.

The user enters an unlock command to cause the emulation controller 24 to perform the predefined unlock I/O access sequence over the target system bus 38 to unlock the control registers. An unlock command option specifies the control registers to be unlocked. The unlock command enables the user to unlock, and thereafter program or examine the contents of selected control registers without changing the state of the processor emulation module 30.

Figure 2:
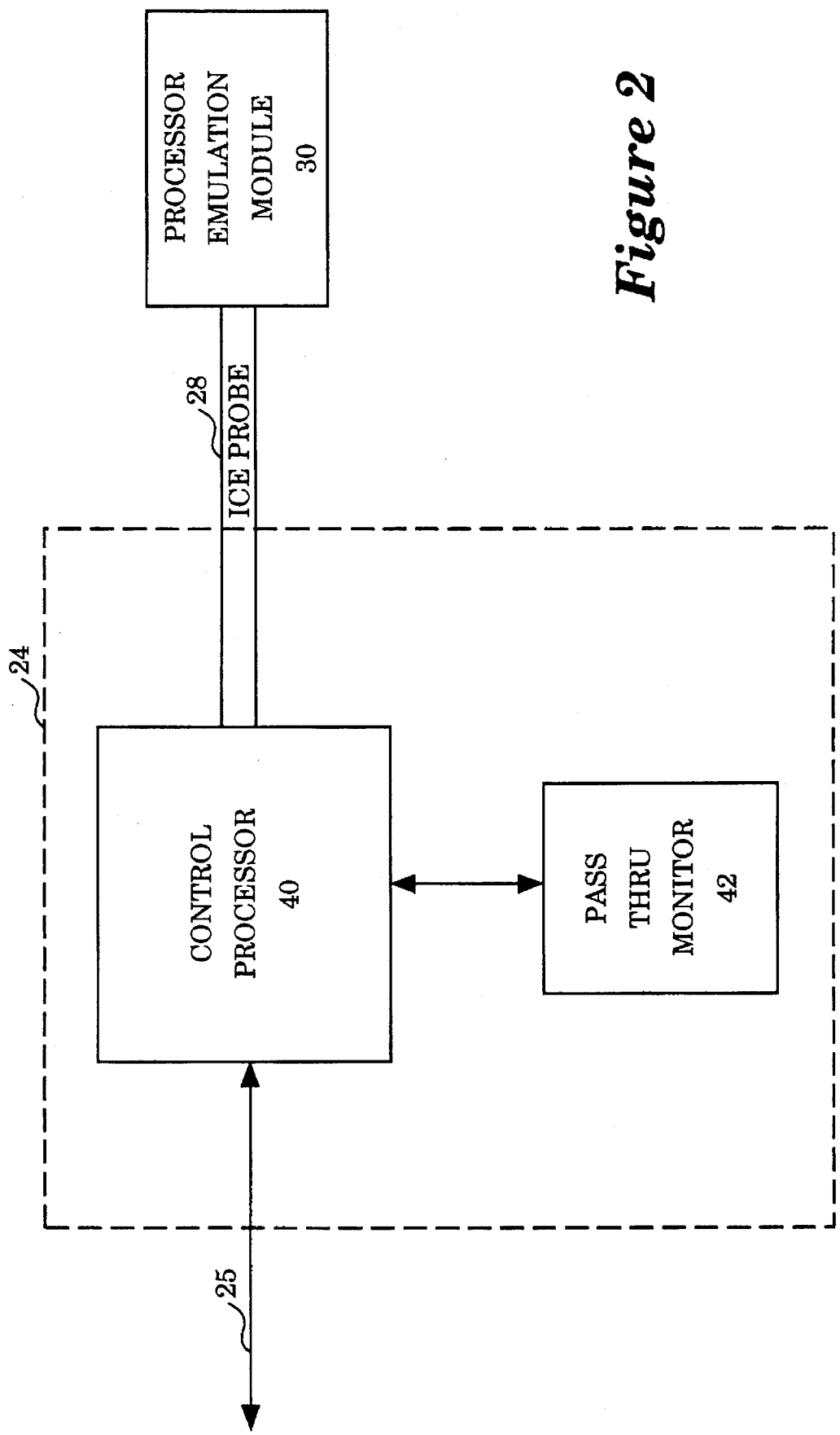
FIG. 2 is an illustration of the hardware and firmware elements of the emulation controller.

FIG. 2 illustrates the hardware and firmware elements of the emulation controller 24, and shows the attached processor emulation module 30. The emulation controller 24 is comprised of a control processor 40 that executes a programmable read-only memory based pass-through monitor program (PTM) 42.

The control processor 40 implements an on-chip serial port coupled to serial communication line 25. The control processor 40 implements an on-chip parallel port coupled to the ICE probe 28. The control processor 40 receives commands from the host computer 22 over the serial communication line 25.

The pass-through monitor 42 executing on the control processor 40 verifies and executes the commands. Accordingly, the pass-through monitor 42 causes the control processor 40 to issue the appropriate control messages to the processor emulation module 30 through the ICE probe 28.

The control processor 40 receives messages from the processor emulation module 30 through the ICE probe 28. The pass-through monitor 42 interprets the messages and causes the control processor 40 to transfer messages to the host computer system 22 over the serial communication line 25.

During the ICE mode, the control processor 40 receives commands from the host computer system 22 to access the resources of the target computer system 26. The pass-through monitor 42 executing on the control processor 40 verifies and interprets the commands and causes the control processor to perform the specified access function.

For example, user commands received from the host computer system 22 cause the control processor 40 to read the target system memory 32 through the ICE probe 28 over the target system bus 38.

Figure 3:
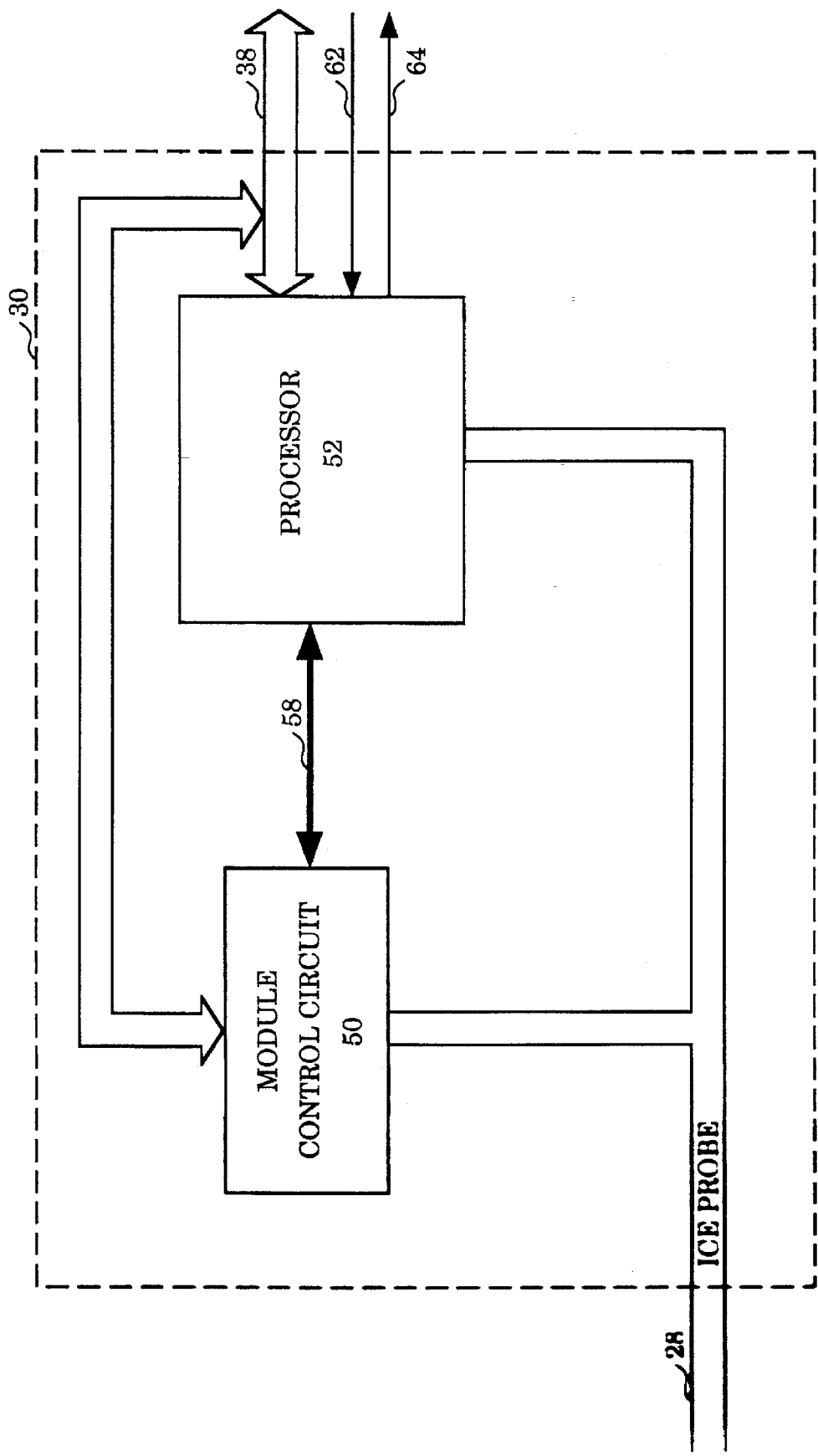
FIG. 3 is a diagram illustrating the processor emulation module which comprises a processor and an module control circuit coupled to the target system bus.

FIG. 3 illustrates the processor emulation module 30. The processor emulation module 30 comprises a processor 52 and an module control circuit 50. The processor 52 and the module control circuit 50 are coupled to the target system bus 38. The target system bus 38 comprises address, data and control signal for transferring data to and from the target system memory 32 and the target system I/O and power control circuit 34.

For one embodiment, the processor 52 comprises a specialized version of the target processor for the target computer system 26. The processor 52 provides the input/output pins provided by the target processor. In addition, the processor 52 provides a set of emulation control pins which are coupled to an emulation control bus 58. The processor 52 is substantially similar to the target processor for the computer system 26 apart from the control pins for the emulation control bus 58.

The module control circuit 50 receives control messages from the emulation controller 24 through the ICE probe 28. The module control circuit 50 decodes the control messages and issues the appropriate control signals to the processor 52 over the emulation control bus 58.

For example, a start processor emulation message from the emulation controller 24 causes the module control circuit 50 to issue a start emulation control signal to the processor 52. The start emulation control signal causes the processor 52 to begin program execution and enter the processor emulation mode.

During the processor emulation mode, the processor 52 performs the program execution function of the normal target processor. The processor 52 communicates over the target system bus 38 and executes the target computer system 26 software.

A halt processor emulation message from the emulation controller 24 causes the module control circuit 50 to issue a halt emulation control signal to the processor 52 and causes the processor emulation module 30 enter the ICE mode. The halt emulation control signal causes the processor 52 to halt program execution.

The module control circuit 50 enables the emulation controller 24 to perform accesses over the target system bus 38. During the ICE mode, the emulation controller 24 to reads the target system memory 32 through the module control circuit 50 over the target system bus 38. The emulation controller 24 also accesses the target system I/O and power control circuit 34 through the module control circuit 50 over the target system bus 38.

During the processor emulation mode, the processor 52 senses the SMI signal 62 indicating that the hardware power control functions require servicing by the SMM software. The processor 52 enters the system management mode when the SMI interrupt occurs, and generates the SM-MEM select signal 64 to access the SM-MEM overlay memory in the target system memory circuit 32 during the system management mode.

The processor 52 transfers an smm_entry message to the module control circuit 50 over the emulation control bus 58 to indicate that the system management interrupt (SMI) has occurred and that the system management mode has been entered. The processor 52 services the hardware power control functions by executing the SMI interrupt service routine from the SM-MEM.

The processor 52 exits the system management mode by executing a RESUME instruction from the SMI service routine in the SM-MEM. The processor 52 transfers an smm_exit message to the module control circuit 50 over the emulation control bus 58 to indicate that the system management mode has ended. When the user enters the SMMEM command, the emulation controller 24 writes a mode control register in the target system I/O and power control circuit 34. The emulation controller 24 sets or clears an smm_flag in the mode control register to enable or disable the SM-MEM.

If the SMMEM command is the SMMEM enable command, the emulation controller 24 sets the smm_flag in the mode control register if the processor 52 is not in the system management mode. The emulation controller 24 does not set the smm_flag in the mode control register if the processor 52 is already in the system management mode.

If the SMMEM command is the SMMEM disable command, the emulation controller 24 clears the smm_flag in the mode control register if the processor 52 is not in the system management mode. The emulation controller 24 signals an error to the host computer system 22 if the processor 52 is in the system management mode when the SMMEM disable command is issued.

When the user enters the unlock command, the emulation controller 24 performs the predefined unlock I/O access sequence over the target system bus 38 to unlock the control registers specified by the unlock command. The emulation controller 24 then may perform I/O accesses over the target system bus 38 through the module control circuit 50. For example, the unlock command provides a processor mode option for unlocking a processor power mode register in the target system I/O and power control circuit 34. The emulation controller 24 processes the unlock processor mode command by performing an I/O access sequence over the target system bus 38 to unlock the processor power mode registers. For one embodiment, the processor power mode register unlock sequence comprises three consecutive I/O writes; a byte write of 0 to port 23 hex, a byte write of 80 hex to port 22 hex, and a word write of 0080 hex to port 22 hex.

For another example, the unlock command provides an input/output enable option for enabling access to the input/output control registers in the target system I/O and power control circuit 34. The emulation controller 24 processes the unlock input/output enable command by performing an I/O access sequence over the target system bus 38 to unlock the input/output control registers. For one embodiment, input/output enable unlock sequence comprises four consecutive I/O reads; a word read to port FC23 hex, a word read to port F023 hex, a word read to port C023 hex, and a word read to port 0023 hex.

Figure 4:
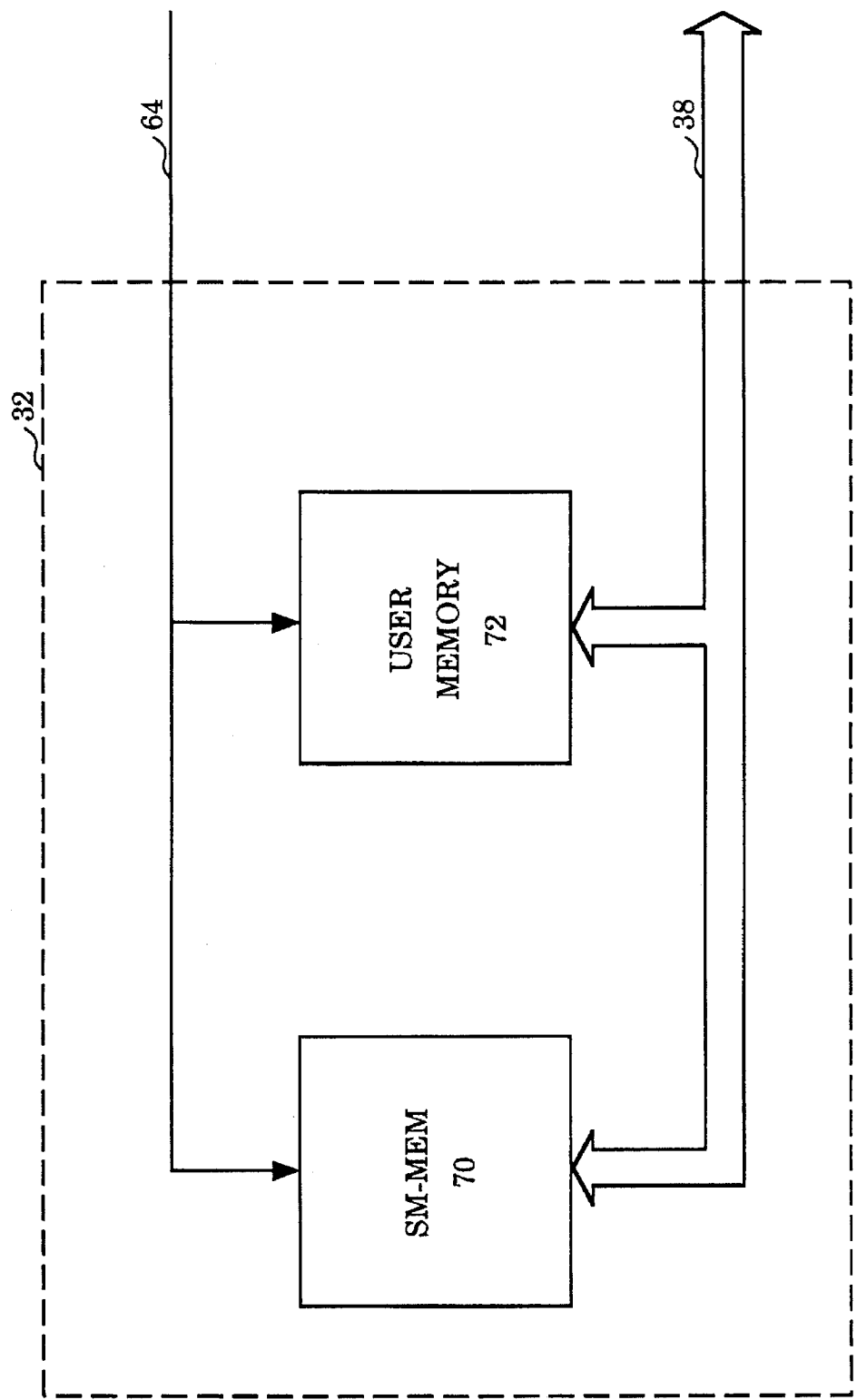
FIG. 4 illustrates the target system memory which comprises a user system memory and a system management memory (SM-MEM)

FIG. 4 illustrates the target system memory 32. The target system memory 32 comprises a user memory 72 and a system management memory (SM-MEM) 70. The user memory 72 and the SM-MEM 70 are accessed over the target system bus 38.

For one embodiment, the SM-MEM 70 overlays the user memory 72 at the address range 30000 hex to 3FFFF hex. The SM-MEM select signal 64 selects either the SM-MEM 70 or the user memory 72 in the address range 30000 hex to 3FFFF hex on the target system bus 38. The processor 52 issues the SM-MEM select signal 64 to select the SM-MEM 70 while in the system management mode. The processor 52 issues the SM-MEM select signal 64 to select the user memory 72 while not in the system management mode.

The SMI signal 62 interrupts the processor 52 and causes the processor 52 to enter the system management mode. Upon entry into the system management mode, the processor 52 stores the internal processor state (including internal registers) into the SM-MEM 70. The processor 52 then starts executing code from a fixed address in the SM-MEM 70 to start the system management interrupt service routine. The system management interrupt service routine services the hardware power management functions for the target computer system 26.

The module control circuit 50 contains an ice_exit register accessible by the emulation controller 24 through the ICE probe 28. The emulation controller 24 writes the ice_exit register to set conditions that cause the processor emulation module 30 to break from the processor emulation mode to the ICE mode.

For example, the ice_exit register includes an exit on system management mode (exit_on_smm) flag. The module control circuit 50 sets the exit on smm flag to cause the module control circuit 50 to halt the processor 52 and break into ICE mode when the processor 52 enters the system management mode. The module control circuit 50 determines the entry into the system management mode via the smm_entry message from the processor 52 over the emulation control bus 58.

The module control circuit 50 also contains a break_cause register accessible by the emulation controller 24 through the ICE probe 28. The module control circuit 50 sets flags in the break_cause register to indicate an emulation break cause when the processor emulation module 30 breaks from the processor emulation mode to the ICE mode.

For example, the break_cause register includes a system management mode cause (smm_cause) flag. The module control circuit 50 sets the smm_cause flag when the smm_entry message is received from the processor 52 over the emulation control bus 58 and causes a break into the ICE mode.

The host computer system 22 issues the go_until_smi command to the emulation controller 24 over the serial communication line 25. The PTM 42 on the emulation controller 24 decodes the command and sets an smi_break_ emulation flag to indicate that the go_until_smi command is being performed. The smi_break_emulation flag is set in an internal control processor 40 register. The PTM 42 on the emulation controller 24 then writes the ice_exit register of the module control circuit 50 to set the exit_on_smm flag.

The PTM 42 then issues the start processor emulation message to the module control circuit 50. The start processor emulation message causes the module control circuit 50 to issue the start emulation control signal to the processor 52. The start emulation control signal causes the processor 52 to start program execution in the processor emulation mode. During the processor emulation mode, the processor 52 performs the program execution functions of the normal target processor.

Figure 5:
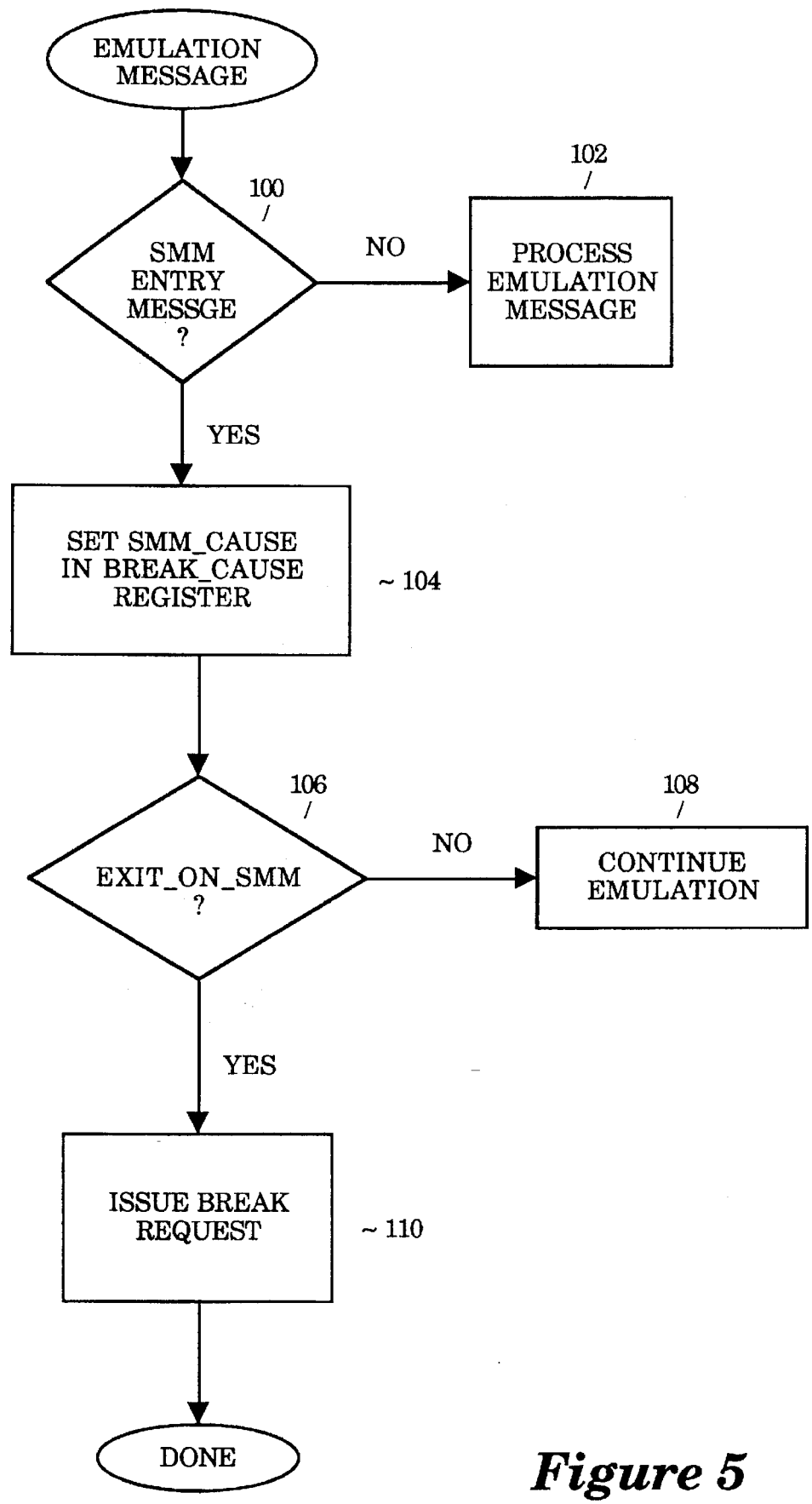
FIG. 5 is a flow diagram that illustrates the processing of an emulation message received over the emulation control bus by the module control circuit.

FIG. 5 is a flow diagram that illustrates the processing of an emulation message by the module control circuit 50 after the go_until_smi is issued. The emulation message is received over the emulation control bus 58. The processor emulation module 30 is in the processor emulation mode and the exit on smm flag in the ice_exit register is set when the emulation message is received.

At decision block 100, the module control circuit 50 determines whether the emulation message is the smm_entry message. If the emulation message is not the smm_entry message, then control proceeds to block 102 to process the emulation message. If the emulation message is the smm_entry message indicating that the processor 52 has entered the system management mode, then control proceeds to block 104.

At block 104, the module control circuit 50 sets the smm_cause flag in the break_cause register. The smm_cause flag indicates that the processor 52 has entered the system management mode. Thereafter, control proceeds to decision block 106.

At decision block 106, the module control circuit 50 determines whether the exit_on_smm flag is set in the ice_exit register. If the exit_on_smm flag is not set, then control proceeds to block 108 to continue processor emulation mode according to the go_until_smi command.

If the exit_on_smm flag is set at decision block 106 indicating the go_until_smi operation, then control proceeds to block 110. At block 110, the module control circuit 50 issues a break request to the emulation controller 24 through the ICE probe 28.

Figure 6:
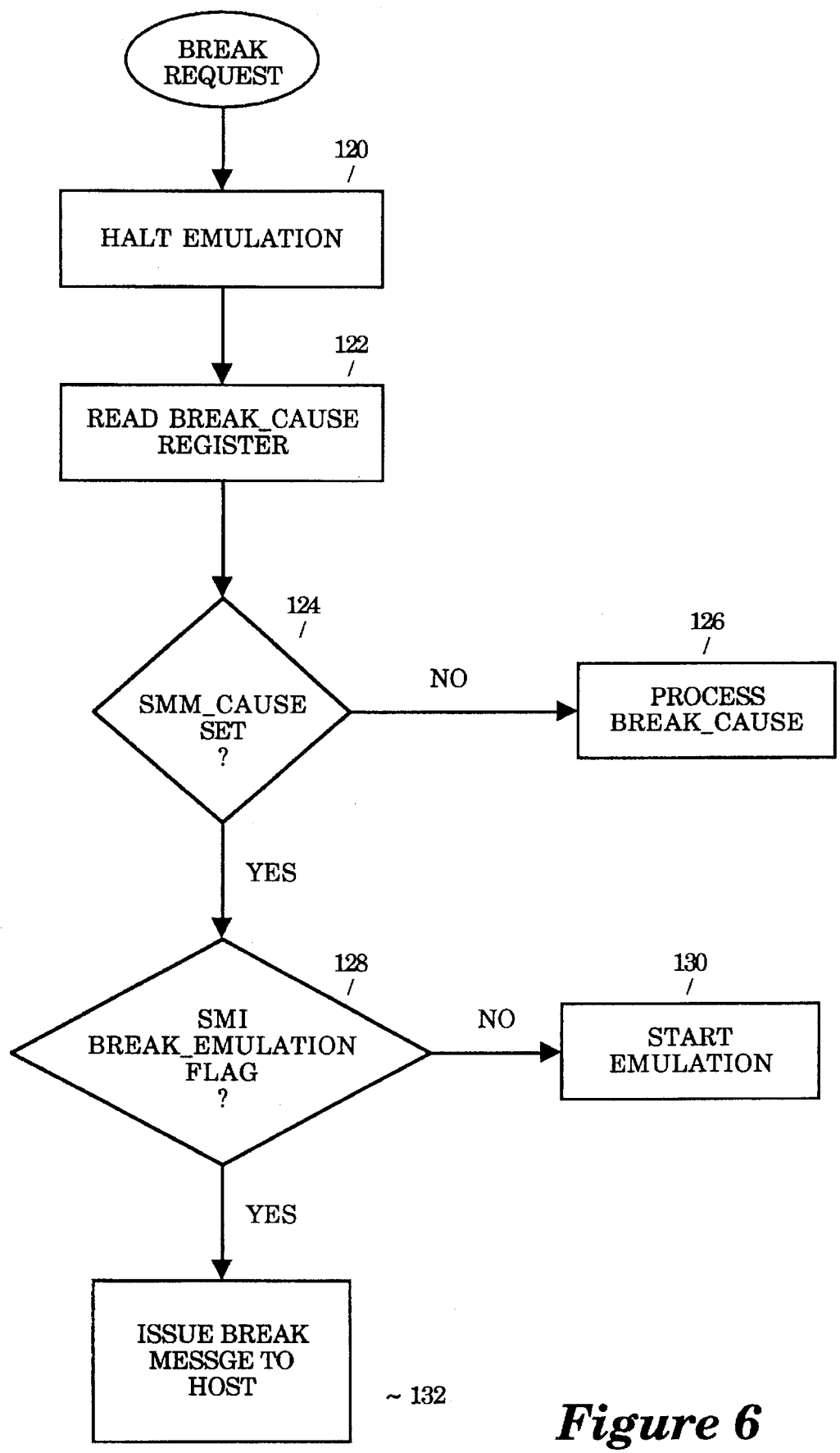
FIG. 6 illustrates the processing of the break request from the module control circuit by the pass through monitor.

FIG. 6 illustrates the processing of the break request from the module control circuit 50 by the PTM 42. At block 120, the PTM 42 responds to the break request by issuing a halt processor emulation command to the module control circuit 50 through the ICE probe 28.

The halt processor emulation message causes the module control circuit 50 to issue the halt emulation control signal to the processor 52 over the emulation control bus 58. The halt emulation control signal causes the processor 52 to halt program execution and enter the ICE mode.

Thereafter at block 122, the PTM 42 reads the break_cause register of the module control circuit 50 to determine the cause of the break request. Control then proceeds to decision block 124.

At decision block 124, if the smm_cause flag of the break_cause register is not set, then control proceeds to block 126 to process another type of break event. At block 126, the PTM 42 handles the break request according to the contents of the break_cause register.

If the smm_cause flag in the break_cause register is set at decision block 124, then control proceeds to decision block 128. At decision block 128, the PTM 42 determines whether the smi_break_emulation flag is set indicating that the go_until_smi command is being performed.

If the smi_break_emulation flag is not set at decision block 128, then control proceeds to block 130. At block 130, the PTM 42 issues the start processor emulation message to the module control circuit 50. The start processor emulation message causes the module control circuit 50 to issue the start emulation control signal to the processor 52 to start program execution in the processor emulation mode.

If the smi_break_emulation flag is set at decision block 128, then control proceeds to block 132. At block 132, the PTM 42 issues a break message to the host computer system 22 over the serial communication line 25. The break message notifies the user that the go_until_smi operation is complete.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. An arrangement for debugging power management software, comprising:

a processor emulator for coupling to a target computer system that executes user software stored in a target system memory and enters an interrogate mode in response to a system management interrupt from the target computer system, wherein the interrogate mode enables access to a system management memory and power control circuitry in the target computer system; and a control module coupled to the processor emulator that enables the processor emulator to begin execution of the user software and to control the processor emulator in the interrogate mode, wherein the control module accesses the system management memory and the power control circuitry via the processor emulator.

2. The arrangement of claim 1, wherein the interrogate mode enables a user to start and halt an emulation mode.

3. The arrangement of claim 1, wherein the interrogate mode enables a user to set a breakpoint.

4. The arrangement of claim 1, wherein the interrogate mode enables a user to clear a breakpoint.

5. The arrangement of claim 1, wherein the interrogate mode enables a user to access a set of registers in a power control circuit.

6. The arrangement of claim 1, wherein the processor emulator generates a system management memory select signal while in the system management mode that causes the system management memory to overlay a user memory.

7. The arrangement of claim 1, wherein the interrogate mode enables a user to set a system management mode bit in a mode control register of the processor emulator, the system management mode bit causing the processor emulator to generate a system management memory to overlay the user memory.

8. The arrangement of claim 1, wherein the interrogate mode enables a user to enter a command for performing a predefined access sequence over a system bus coupled to the processor emulator such that the predefined access sequence unlocks and enables access to a set of control registers contained in a power control circuit.

9. A method for debugging power management software, comprising:

executing user software stored in a target computer system memory with a processor emulator until a system management interrupt occurs;

entering an interrogate mode in response to the system management interrupt, wherein the interrogate mode allows access to a system management memory and power control circuitry in the target computer system; and accessing the system management memory and the power control circuitry during interrogate mode to debug power management software stored in the system management memory.

10. The method of claim 9, wherein the step of entering the interrogate mode further comprises enabling a user to start and halt the execution of the user software.

11. The method of claim 9, wherein the step of entering the interrogate mode further comprises enabling a user to set a breakpoint for the processor emulator.

12. The method of claim 9, wherein the step of entering the interrogate mode further comprises enabling a user to clear a breakpoint.

13. The method of claim 9, wherein the step of entering the interrogate mode further comprises enabling a user to access a set of registers contained in a power control circuit.

14. The method of claim 9, further comprising the step of generating a system management memory select signal while in the system management mode that causes the system management memory to overlay the user memory.

15. The method of claim 9, wherein the step of entering the interrogate mode further comprises enabling a user to set a system management mode bit in a mode control register that causes the system management memory to overlay the user memory.

16. The method of claim 9, wherein the step of entering the interrogate mode further comprises enabling a user to enter a command for performing a predefined access sequence over a system bus coupled to the in-circuit emulator such that the predefined access sequence unlocks and enables access to a set of control registers contained in a power control circuit.

17. A system for debugging power management software, comprising:

means for executing user software stored in a target computer system memory by emulating a processor of the target computer system until a system management interrupt occurs;

means for entering an interrogate mode in response to the system management interrupt, wherein the interrogate mode allows access to a system management memory and to power control circuitry in the target computer system; and means for accessing the system management memory and the power control circuitry during the interrogate mode.

* * * * *